(12) United States Patent
Veguru et al.

(10) Patent No.: US 8,705,402 B2
(45) Date of Patent: Apr. 22, 2014

(54) CLOCKING OF CLIENT SIGNALS OUTPUT FROM AN EGRESS NODE IN A NETWORK

(75) Inventors: Tulasi Veguru, Sunnyvale, CA (US); Gopal Rao, Santa Clara, CA (US); Prasad Paranjape, Fremont, CA (US); Ting-Kuang Chiang, Saratoga, CA (US); Konstantin Saunichev, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 942 days.

(21) Appl. No.: 12/647,342

(22) Filed: Dec. 24, 2009

(65) Prior Publication Data

US 2011/0158229 A1   Jun. 30, 2011

(51) Int. Cl.
*H04J 3/07* (2006.01)
*H04L 12/50* (2006.01)
*G06F 15/173* (2006.01)

(52) U.S. Cl.
USPC ............ 370/254; 370/357; 370/505; 709/224

(58) Field of Classification Search
USPC ................. 370/254–357, 400–474, 505–539; 398/58–98; 709/223–239
See application file for complete search history.

(56) References Cited

U.S. PATENT DOCUMENTS

| | | | | |
|---|---|---|---|---|
| 7,277,459 B1 * | 10/2007 | Abbas | ............................ | 370/539 |
| 7,286,568 B2 * | 10/2007 | Christiansen | ................. | 370/509 |
| 7,443,888 B2 * | 10/2008 | Surek | ............................ | 370/503 |
| 7,539,196 B2 * | 5/2009 | Flavin et al. | .................. | 370/394 |
| 7,542,483 B1 * | 6/2009 | Gianella et al. | ............... | 370/503 |
| 7,583,697 B2 * | 9/2009 | Zou | ............................ | 370/466 |
| 7,602,814 B2 * | 10/2009 | Meagher et al. | .............. | 370/505 |
| 7,630,414 B2 * | 12/2009 | Clauberg | ...................... | 370/540 |
| 7,742,502 B2 * | 6/2010 | Vissers et al. | ................. | 370/473 |
| 2007/0116061 A1 * | 5/2007 | Meagher et al. | .............. | 370/503 |
| 2008/0279553 A1 * | 11/2008 | Meagher et al. | ............... | 398/58 |
| 2010/0014861 A1 * | 1/2010 | Chiang et al. | .................. | 398/79 |
| 2010/0021173 A1 * | 1/2010 | Zhang et al. | .................... | 398/98 |

* cited by examiner

*Primary Examiner* — Man Phan
(74) *Attorney, Agent, or Firm* — David L. Soltz

(57) ABSTRACT

Consistent with the present disclosure, client data, which may include multiplexed data sub-streams, is supplied to an ingress node of a network. Each sub-stream typically has a corresponding data rate, i.e., an original data rate, prior to multiplexing. The client data is encapsulated in a plurality of successive frames that are output from the ingress node and propagate, typically through one or more intermediate nodes, to an egress node. At the egress node, data rates associated with the sub-streams included in each frame are determined based on the amount of client data in each frame. The data rates are then averaged over a given number of frames to thereby filter any wander or deviation in the client data rate. Based on the averaged data rate, justification opportunities are added to the client data in each sub-stream, which are then multiplexed into frames that are output from the egress node. By including the justification opportunities, the effective rate of each sub-stream may be set equal to the original data rate when the sub-streams are demultiplexed after being output from the egress node. An advantage of the present disclosure is that the justification opportunities, are not generated based solely on clock signals generated by PLL circuits. As a result, fewer PLL circuits are required, thereby simplifying system design and minimizing power consumption.

21 Claims, 7 Drawing Sheets

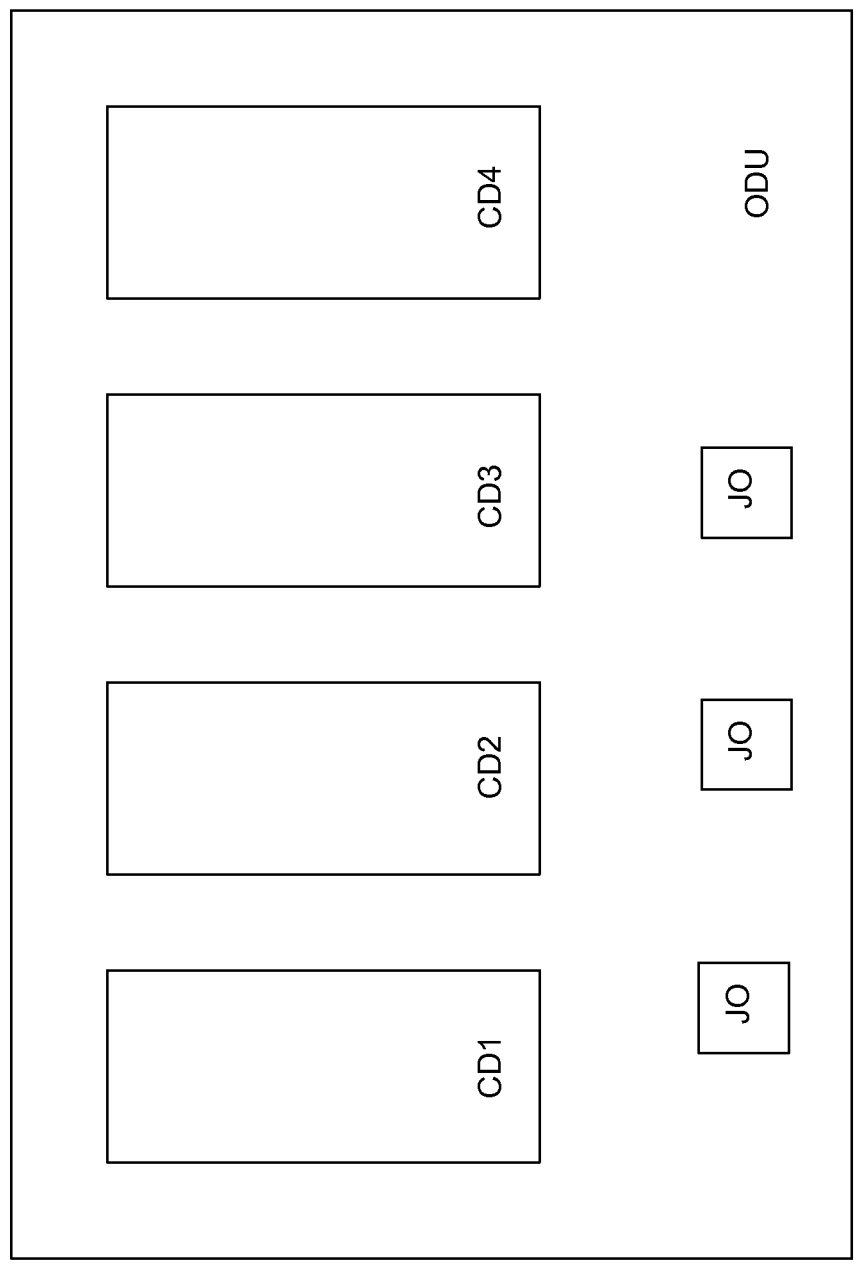

CLOCKING OF CLIENT SIGNALS OUTPUT FROM AN EGRESS NODE IN A NETWORK

BACKGROUND

Communication networks are known that receive signals or data streams supplied to the network from a client, encapsulate the data included in the data streams into pluralities of successive frames, and transport such frames across the network. Typically, each of the client data streams has an associated data rate or frequency, which may be required to be maintained or preserved when the client data streams are output from the network.

Often, a client data stream may include multiplexed sub-streams, each having an associated data rate or frequency that is less than the client data stream itself. When the substreams are demultiplexed after being output from the network, each sub-stream should preferably have the same or substantially the same data rate as when such sub-streams had prior to being multiplexed and input to the network. Accordingly, timing information may be included in the client data streams output from the network, and such timing information may be used to demultiplex the sub-streams with the desired data rates. The timing information may often include so-called justification opportunities, which are bytes which are included in the client data streams in order to adjust the rate at the data is transmitted. For example, if a lower data rate is desired, the justification opportunity bytes may include null data, so that the data rate (or effective data rate), excluding the justification opportunity bytes, is reduced. On the other hand, if the justification opportunity bytes include the client's data, the effective data rate is increased. Typically, justification opportunities are provided for each sub-stream.

In one approach, justification opportunities for each sub-stream are generated based on clock signals, which are themselves output from so-called phase-lock-loop (PLL) circuits. As the information carrying capacity of networks has increased, however, more client data streams, as well as sub-streams, may be required. As a result, an increased number of PLL circuits may also be necessary, thereby increasing system power consumption, as well as system complexity.

Accordingly, an alternative approach is desired whereby justification opportunities are generated for sub-streams with circuitry that consumes relatively little power and has a relatively simple design.

SUMMARY OF THE INVENTION

Consistent with an aspect of the present disclosure, an apparatus is provided that includes a data extraction circuit configured to receive an input frame and extract first data included in the input frame. In addition, a buffer circuitry is provided that is coupled to the data extraction circuit. The buffer circuitry receives the first data from the data extraction circuit. Further, a processor circuit is included in the apparatus that is coupled to the data extraction circuit and the buffer circuitry, such that the processor circuit generates justification event bits based on an amount of first data included in the input frame. The processor circuit is also configured to add justification opportunity bytes to the first data. The justification event bits indicate whether the justification opportunity bytes include a portion of the first data or null bits, such that a frequency associated with the first data is a predetermined frequency. In addition, a multiplexer is provided that is coupled to the buffer circuitry. The multiplexer is configured to multiplex the first data with second data and supply an output frame including the first data, second data, and the justification opportunity bytes.

Consistent with an additional aspect of the present disclosure, an apparatus is provided that includes a data extraction circuit configured to receive an input frame and extract first data included in the input frame. Buffer circuitry is also provided that is coupled to the data extraction circuit. The buffer circuitry receives the first data from the data extraction circuit. Further, a multiplexer is included that is coupled to the buffer circuitry, and a processor circuit is provided that is coupled to the data extraction circuit and the multiplexer. The processor generates justification event bits based on an amount of first data included in the input frame and is configured to supply the justification event bits to the multiplexer. The multiplexer is configured to multiplex the first data with second data and supply an output frame that includes justification opportunity bytes, the first data, and the second data. The justification event bits indicate whether the justification opportunity bytes include a portion of the first data or null bits, such that a frequency associated with the first data is a predetermined frequency.

It is to be understood that both the foregoing general description and the following detailed description are exemplary and explanatory only and are not restrictive of the invention, as claimed.

The accompanying drawings, which are incorporated in and constitute a part of this specification, illustrate various embodiments and together with the description, serve to explain aspects of the present disclosure.

BRIEF DESCRIPTION OF THE DRAWINGS

FIG. 7 is a simplified block diagram of an exemplary output frame that conforms with an International Telecommunications Union (ITU) G.709 recommendation.

DESCRIPTION OF THE EMBODIMENTS

Consistent with the present disclosure, client data, which may include multiplexed data sub-streams, is supplied to an ingress node of a network. Each sub-stream typically has a corresponding data rate, i.e., an "original data rate", prior to multiplexing. The client data is encapsulated in a plurality of successive frames that are output from the ingress node and propagate, typically through one or more intermediate nodes, to an egress node. At the egress node, data rates associated with the sub-streams included in each frame are determined based on the amount of client data in each frame. The data rates are then averaged over a given number of frames to thereby filter any wander or deviation in the client data rate. Based on the averaged data rate, justification opportunities are added to the client data in each sub-stream, which are then multiplexed into frames that are output from the egress node. By including the justification opportunities, the effective rate of each sub-stream may be set equal to the original data rate when the sub-streams are demultiplexed after being output from the egress node. An advantage of the present disclosure is that the justification opportunities are not generated based solely on clock signals generated by PLL circuits. As a result, fewer PLL circuits are required, thereby simplifying system design and minimizing power consumption.

Reference will now be made in detail to the following exemplary embodiments, examples of which are illustrated in the accompanying drawings. Wherever possible, the same reference numbers will be used throughout the drawings to refer to the same or like parts.

Figure 1:
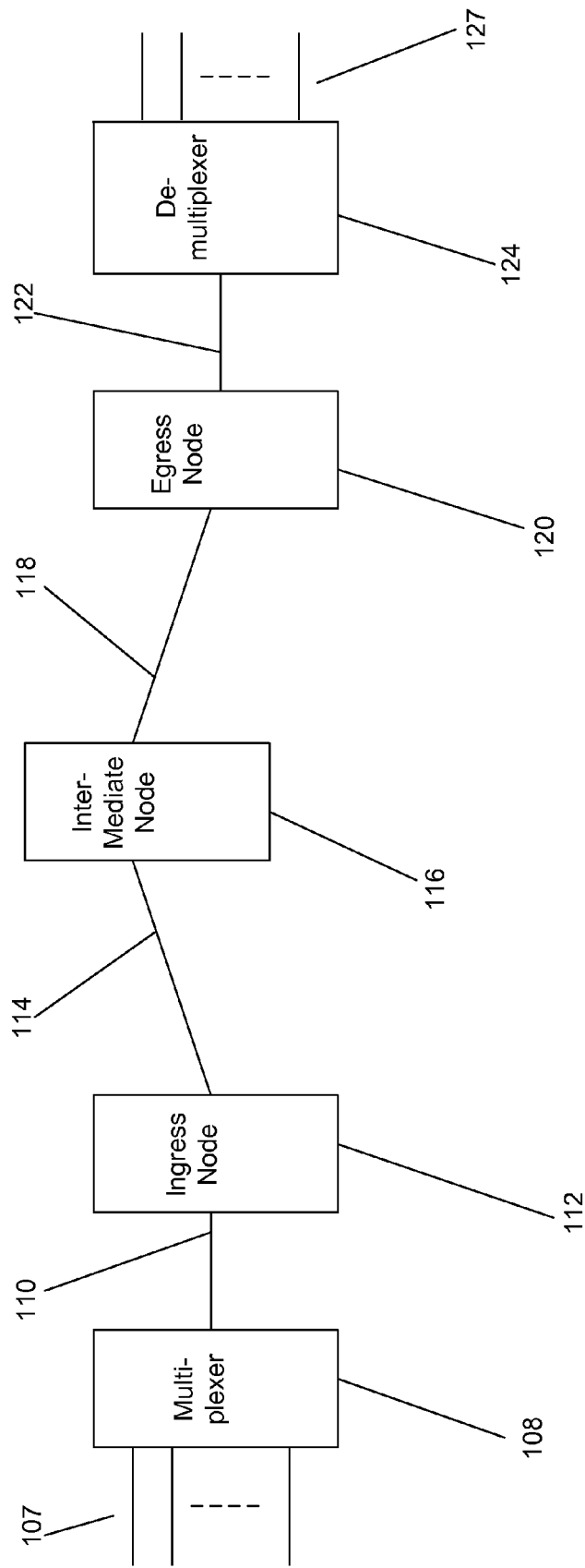
FIG. 1 is a block diagram of a network consistent with an aspect of the present disclosure.

FIG. 1 illustrates a network 100 consistent with an aspect of the present disclosure. Network 100 includes a multiplexer 108 that multiplexes lower rate client data streams 107 or sub-streams into a higher rate data stream 110. Each of sub-streams 107 may have a particular data rate or original data rate. Data stream 110 may, in turn, be supplied to an ingress node 112, which encapsulates the data stream in a series of frames, which are fed to intermediate node 116 via link 114.

Figure 2:
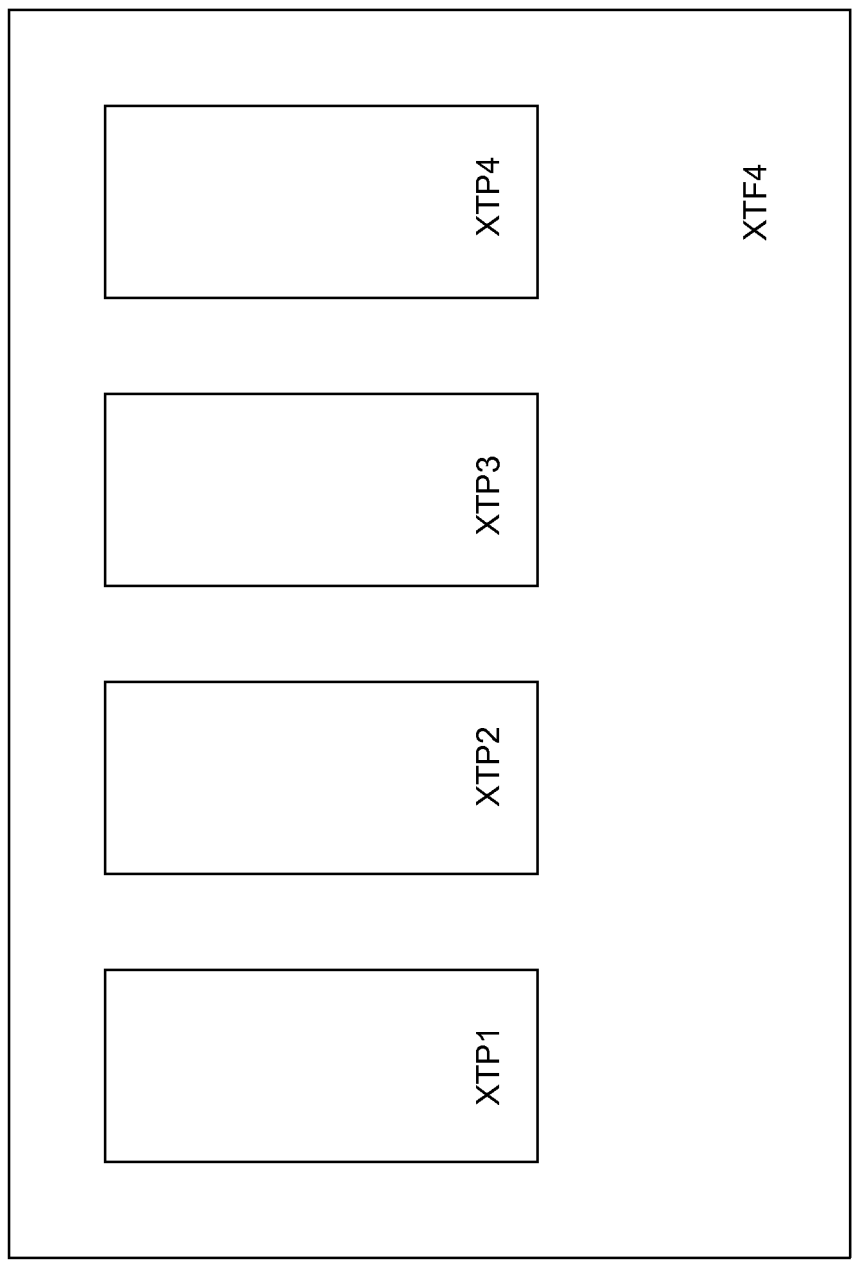
FIG. 2 illustrates an example of a first input frame consistent with another aspect of the present disclosure.

FIG. 2 illustrates a simplified diagram of a frame XTF4 which may be one of the frames output from ingress 112. It is understood that each frame output from ingress node 112 may have the same or similar structure as the XTF4 frame shown in FIG. 2. Frame XTF4 includes portions or sub-frames XTP-1 to XTP-4 which are multiplexed into frame XTF4. Alternatively, fewer than four or more than four sub-frames may be included in frame XTF4.

Figure 3:
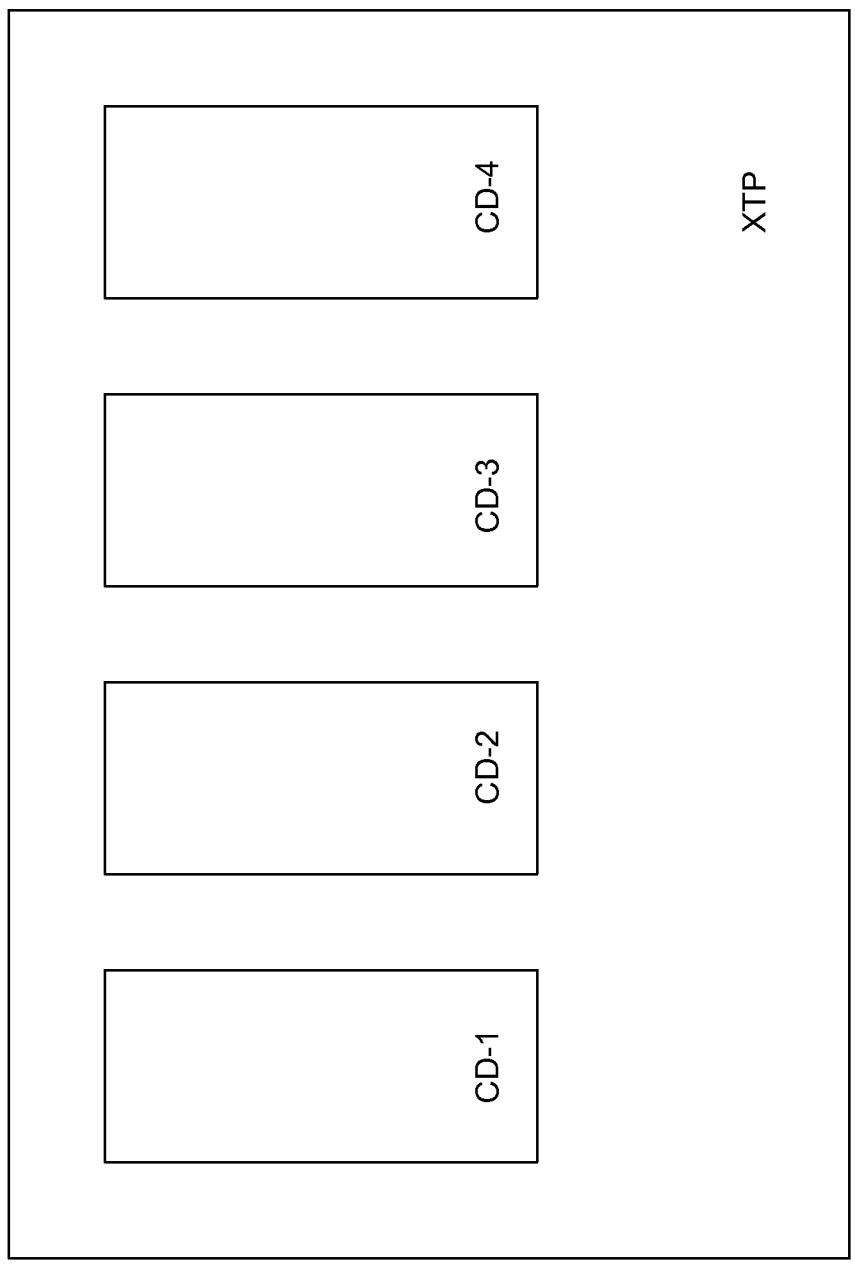
FIG. 3 illustrates an example of a second input frame included in the first input frame shown in FIG. 2.

FIG. 3 illustrates frame XTP-1 in greater detail. It is understood that remaining frames XTP-2 to XTP-4 may have the same or similar structure as XTP-1. Frame XTP-1 may include a plurality of client data portions CD-1 to CD-4, each of which corresponding to one of sub-streams 107, for example. It is understood that any appropriate number of client data portions may be included in frame XTP-1, as well as remaining XTP frames in the XTF4 frame.

As noted above, the XTF4 frames may be transmitted over link 114 to intermediate node 116, where, in one example, the XTF4 frames are disassembled and the XTP frames (e.g., XTP-1 to XTP-4) are extracted. The XTP frames are typically not disassembled but are re-encapsulated in new XTF4 frames and transmitted, in the example shown in FIG. 1, to egress node 120. It is understood, however, that the XTF4 output from intermediate node 116 may be provided to one or more intermediate nodes instead, such that the XTP frames are extracted, re-encapsulated and retransmitted at each such intermediate node.

Returning to FIG. 1, intermediate node 116 outputs an XTF4 frame to egress node 120, which extracts the XTP frames (XTP1 to XTP4) from the received XTF4 frame, and multiplexes the client data included in the XTP frames into output data stream 122. Preferably, output data stream 122 has the same or substantially the same data rate as input data stream 110 supplied to ingress node 112. Output data stream 124 is then supplied to demultiplexer 124, which demultiplexes and outputs sub-streams 127. Sub-streams 127 were included in stream 122 and correspond to sub-streams 107. Preferably, each of sub-streams 127 has a corresponding original data rate. An example of a network consistent with that shown in FIG. 1 is discussed U.S. patent application Ser. No. 12/367,401 filed Feb. 6, 2009, the entire contents of which are incorporated herein by reference.

Figure 4:
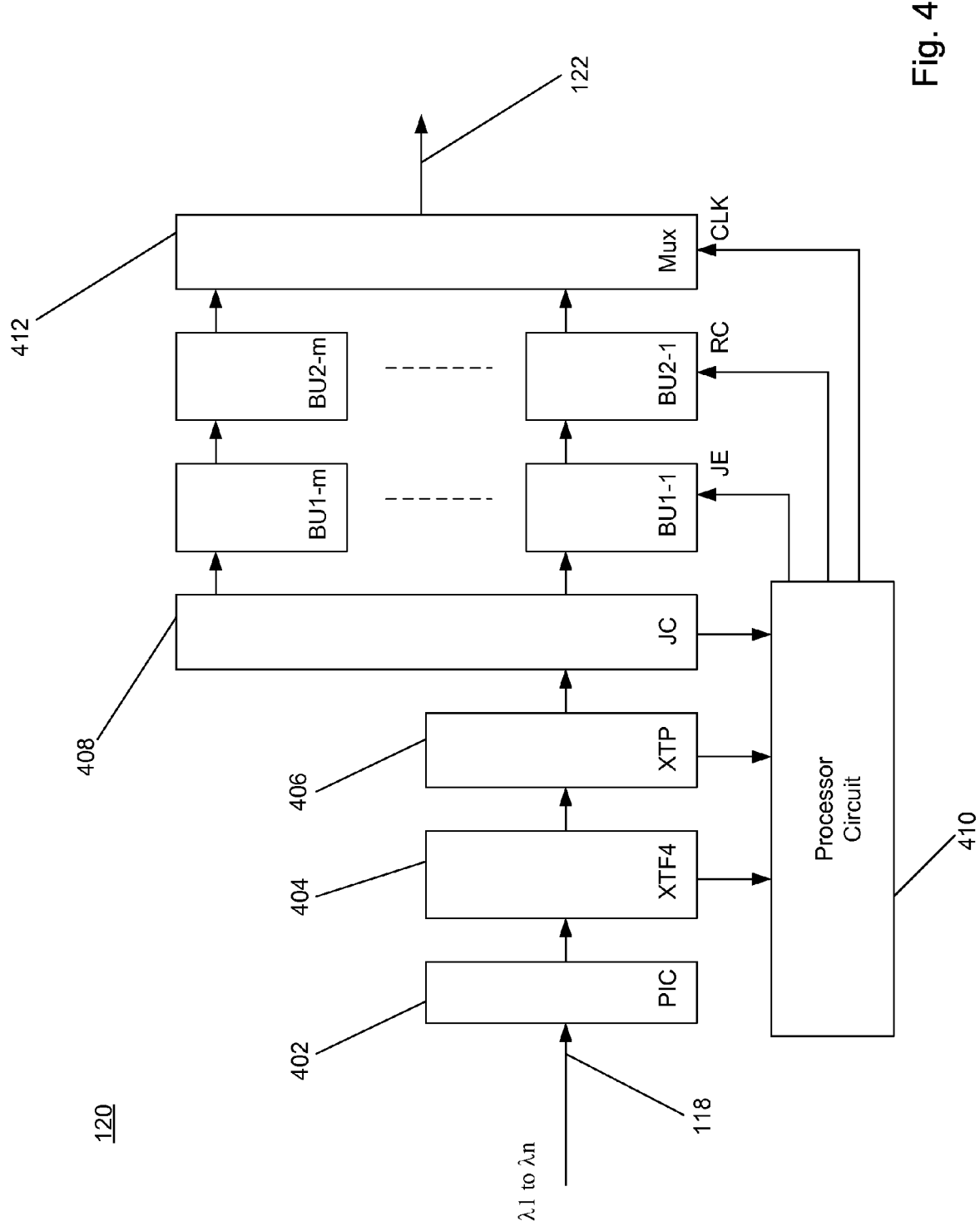
FIG. 4 illustrates circuitry included in an egress node consistent with an additional aspect of the present disclosure.

FIG. 4 illustrates egress node 120 in greater detail. Link 118 may be an optical fiber link carrying a plurality of optical signals, each having a corresponding one of a plurality of wavelengths $\lambda 1$ to $\lambda n$. These optical signals may be supplied to a photonic integrated circuit (PIC) 402, which demultiplexes each of the optical signals and generates corresponding electrical signals. Exemplary PICs are described in U.S. Patent Application Publication No. 2009-0245795 and U.S. Pat. No. 7,283,694, the entire contents of both of which are incorporated herein by reference.

The electrical signals output from PIC 402 carry the XTF4 frames and are supplied to XTF4 extraction circuitry 404, which may include clock-and-data recovery circuitry. Extraction circuitry 404 may extract a clock signal associated with the XTF4 frame, as well as the XTP frames, XTP1 to XTP4, for example, and supply the XTP frames to XTP extraction circuitry 406. Extraction circuitry 406, in turn, supplies the client data included in the XTP frames to a justification control (JC) interpretation circuitry 408.

As noted above, the justification opportunity (JO) bytes may be included in the client data such that the effective rate of the client data is at a predetermined or desired value. Such JO bytes may either include null data or client data depending on whether a lower effective rate or a higher effective rate is desired. JC bytes may be inserted at one or more locations in the XTP frame to indicate whether the JO bytes include client or null data, and JC interpretation circuit 408 is configured to identify such JC bytes and determine whether the JO bytes in a given XTP frame include client or null data. Accordingly, a total amount of client data in the XTP frame may be ascertained.

As further shown in FIG. 4, client data extracted from extraction circuit 406 is passed through JC interpretation circuitry 408 to buffers BU1-1 to BU1-$m$, each of which storing a portion of the client data associated with one of sub-streams 107 shown in FIG. 1. Processor circuit 410 (which is coupled to circuitry 404, 406, 408, BU1-1 to BU1-$m$, BU2-1 to BU2-$m$, and multiplexer 412) receives XTP clock information from circuitry 404, as well as information indicative the justification opportunities in the XTP and client from circuitry 406 and 408, respectively. Based on such information, control circuit 410 outputs justification event (JE) data to buffer circuitry BU1-1 to BU1-$m$, and, in accordance with the JE data, the buffer circuitry adds or inserts further JOs, having either null or customer data, into the customer data. When these buffer circuits store a threshold amount of data (e.g., client data and JOs), each outputs the data stored therein to corresponding buffer circuitry BU2-1 to BU2-$m$. These buffers, in turn, output the data stored therein to a multiplexer 412, which multiplexes the data supplied from buffers BU2-1 to BU2-$m$ into output data stream 122.

Rather than generate clock signals with multiple phase-lock-loop (PLL) circuits, processor circuit 410 calculates or determines the JE data based on a data rate associated with each sub-stream included in the XTP frames. The data rate of each sub-stream may be obtained in a known manner.

It is noted, however, that the data rates associated with the client data included in each XTP frame may vary from one XTP frame to the next due to so-called "wander", which is a known variation in the data rate associated with encapsulated client data as such client data propagates through a network. In order to reduce or eliminate such wander, processor circuit 410 may average the frequencies or data rates of the client data over a given number of XTP and/or XTF4 frames. Based on such averaged or filtered data rates, processor circuit 410 may output JE data, as noted above, such that buffer circuitry BU1-1 to BU1-40 outputs include an appropriate number of JOs including null or client data to reflect the desired data rates of the output data stream and the sub-streams multiplexed therein.

As further shown in FIG. 4, processor circuit 410 further outputs read control (RC) bits to buffers BU2-1 to BU2-40, to control the output of data from these buffers to multiplexer 412. In addition, processor circuit 410 supplies clock signals (CLK) to multiplexer 412, which, in turn, outputs a multiplexed output data stream or streams including the sub-stream data stored in buffers BU2-1 to BU2-40 based on such clock signals. Such clock signals may be generated by a limited number of phase-locked loop (PLL) circuits so that, typically, a relatively small number of clock signals are provided to multiplexer 412. For example, the number clock signals may equal the number of output data streams, as opposed to the aggregate number of sub-streams, as would be required if multiple PLL circuits were provided.

For example, five multiplexed output data streams 122 may be supplied from multiplexer 412, and each may have a nominal data rate of 10 Gbits/second. Each output data stream, however, may include a plurality of sub-streams, as discussed above, and each such substream may have an associated nominal data rate of 1.25 Gbit/second, such that each multiplexed output data stream includes eight sub-streams. Accordingly, rather than provide 40 PLL circuits to generate a clock for each sub-stream, JE data is calculated so that the sub-streams have the appropriate timing. Typically, however, a PLL circuit is provided to generate a clock for each 10 Gbit/second multiplexed stream, so that, in this example, five PLL circuits are provided. Thus, fewer PLL circuits are provided than would otherwise be required if a PLL circuit were included for each sub-stream.

As noted above, based on the JOs included in the output data stream 122, a downstream demultiplexer, such as demultiplexer 124 shown in FIG. 1, can demultiplex and output the sub-streams at the original data rate as such data streams were at prior to being combined by multiplexer 108 (also shown in FIG. 1).

Figure 5:
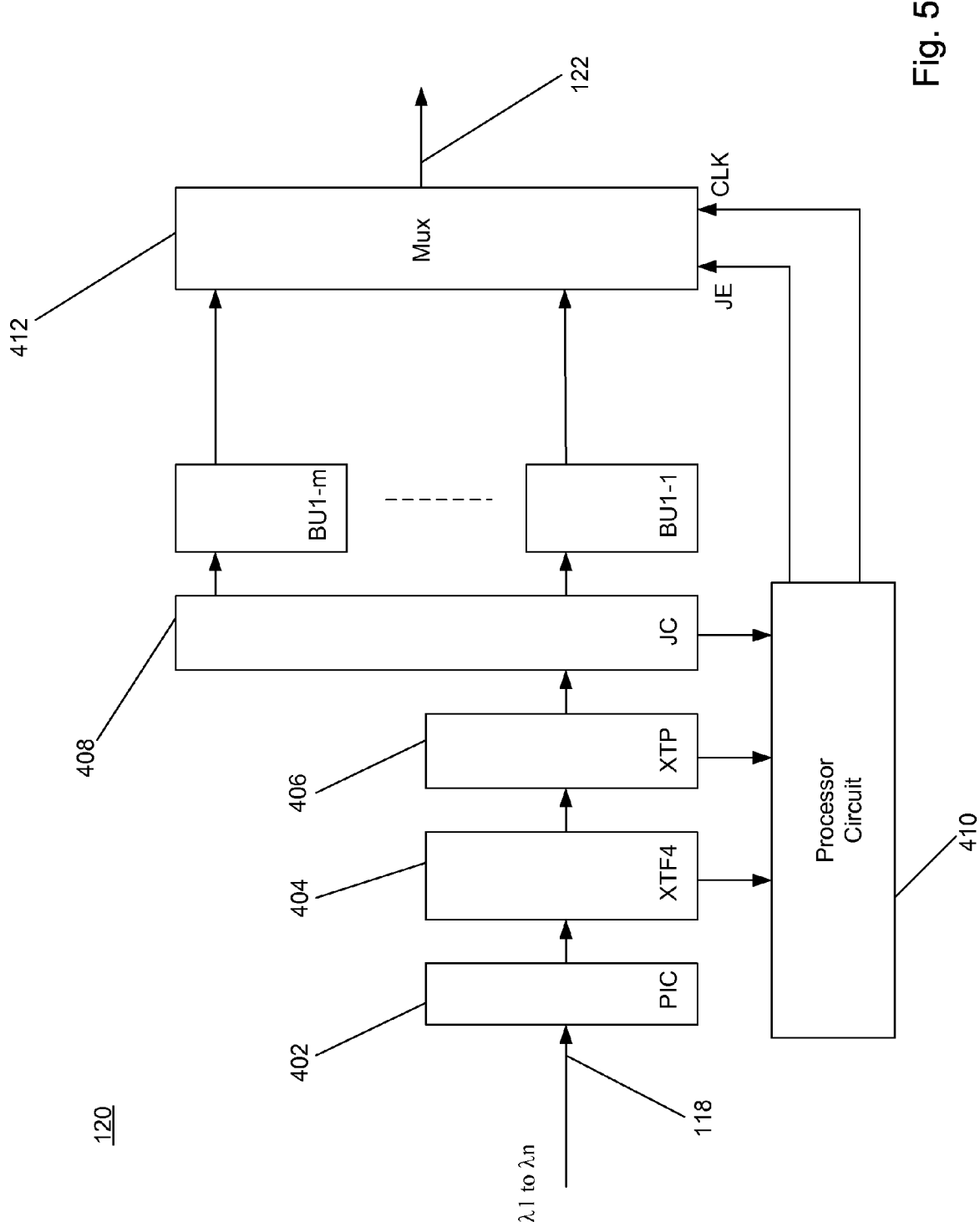
FIG. 5 illustrates an example of a first input frame consistent with another aspect of the present disclosure.

FIG. 5 illustrates another example of egress node 120, which is similar to the example shown in FIG. 4, except that, in FIG. 5, buffers BU2-1 to BU2-40 are omitted and the JE bits are supplied to multiplexer 512. Here, multiplexer 512 inserts or adds the justification opportunities (JOs) to the client data sub-streams, not buffer circuits BU1-1 to BU1-40. Otherwise, output data stream 122 has the same or substantially the same customer data, sub-streams and JOs as the customer data, sub-stream, and JOs in output data stream 122 discussed above in connection with FIG. 4.

Figure 6:
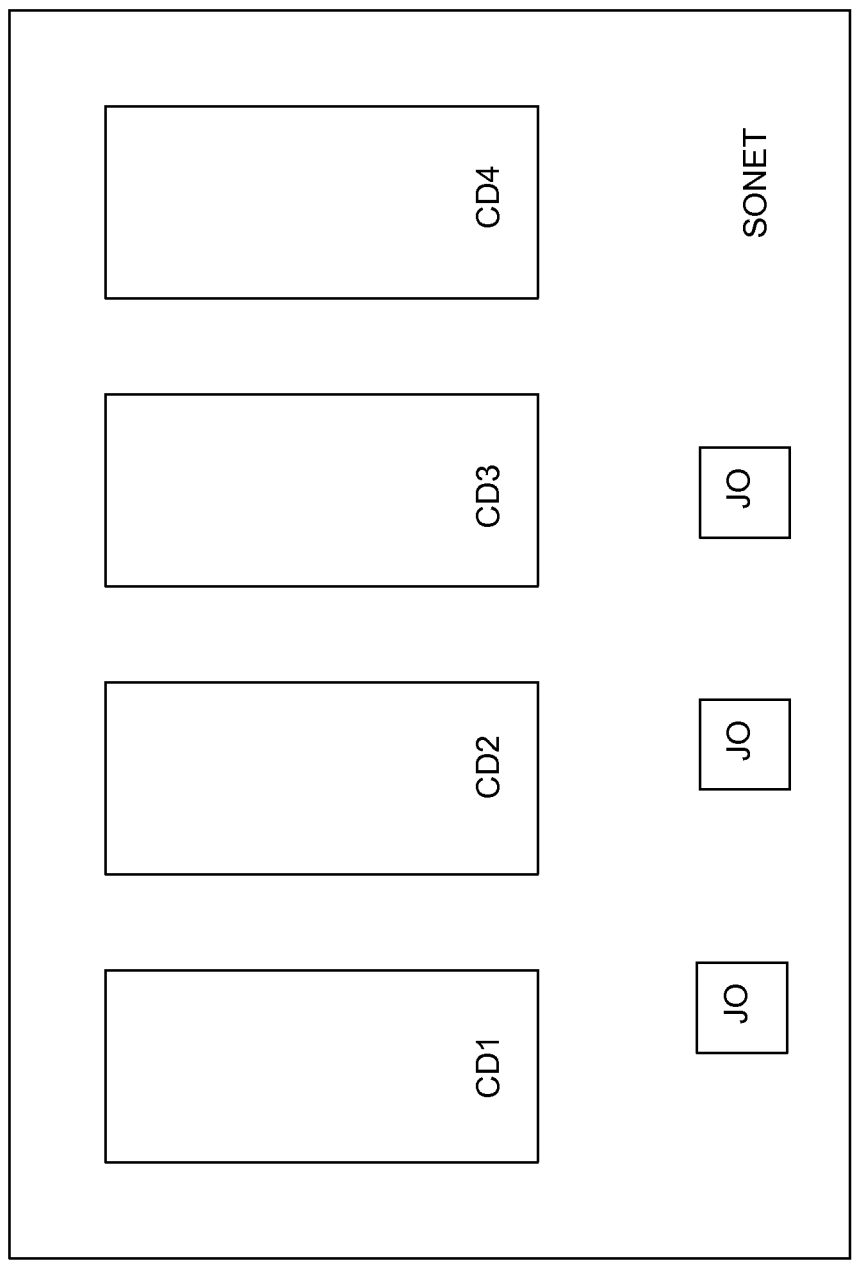
FIG. 6 is a simplified block diagram of an exemplary output frame that conforms with a synchronous optical network (SONET) standard.

Output data stream 122 may carry the customer data and sub-streams in frames, which conform to a variety of different standard formats. For example, as shown in FIG. 6, output data stream 122 may include a plurality of Synchronous Optical Network (SONET) compliant frames, such as frame 600, which includes JOs, among other known header bytes, and client data sub-streams or portions CD1 to CD4. Alternatively, the frames included in output data stream 122 may include optical data unit (ODU) frames compliant or conforming with International Telecommunications Union recommendation G.709, such as frame 700 shown in FIG. 7. Frame 700 may also include JOs and client data or sub-streams CD1 to CD4.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus, comprising:
    a data extraction circuit configured to receive an input frame and extract first data included in the input frame;
    buffer circuitry which is coupled to the data extraction circuit, the buffer circuitry receiving the first data from the data extraction circuit;
    a processor circuit coupled to the data extraction circuit and the buffer circuitry, such that the processor circuit generates justification event bits based on an amount of first data included in the input frame, the processor circuit also being configured to add justification opportunity bytes to the first data, the justification event bits indicating whether the justification opportunity bytes include a portion of the first data or null bits, such that a frequency associated with the first data is a predetermined frequency; and
    a multiplexer coupled to the buffer circuitry, the multiplexer being configured to multiplex the first data with second data and supply an output frame including the first data, second data, and the justification opportunity bytes,
    wherein the input frame is a first input frame, and the data extraction circuit is a first data extraction circuit, the apparatus further including:
        a second data extraction circuit configured to receive a second input frame and extract the first input frame from the second input frame.

2. An apparatus in accordance with claim 1, wherein the first input frame includes justification control bytes, the data extraction circuit being configured to supply the justification control bytes to the processor circuit.

3. An apparatus in accordance with claim 1, wherein the output frame conforms to an ODU format.

4. An apparatus in accordance with claim 1, wherein the output frame conforms to a SONET format.

5. An apparatus in accordance with claim 1, wherein the second data extraction circuit includes a clock-and-data recovery circuit.

6. An apparatus in accordance with claim 1, further including a phase-lock-loop circuit coupled to the multiplexer, the phase-locked loop circuit supplying a clock signal to the multiplexer.

7. An apparatus comprising:
    a data extraction circuit configured to receive an input frame and extract first data included in the input frame;
    buffer circuitry which is coupled to the data extraction circuit, the buffer circuitry receiving the first data from the data extraction circuit;
    a processor circuit coupled to the data extraction circuit and the buffer circuitry, such that the processor circuit generates justification event bits based on an amount of first data included in the input frame, the processor circuit also being configured to add justification opportunity bytes to the first data, the justification event bits indicating whether the justification opportunity bytes include a portion of the first data or null bits, such that a frequency associated with the first data is a predetermined frequency; and
    a multiplexer coupled to the buffer circuitry, the multiplexer being configured to multiplex the first data with second data and supply an output frame including the first data, second data, and the justification opportunity bytes,
    wherein the buffer circuitry includes first and second buffer circuits, the first buffer circuit temporarily storing the justification opportunity bytes and supplying the justification opportunity bytes and the first data to the second buffer circuit, the second buffer circuit supplying the first data and the justification opportunity bytes to the multiplexer.

8. An apparatus, comprising:
a data extraction circuit configured to receive an input frame and extract first data included in the input frame;
buffer circuitry which is coupled to the data extraction circuit, the buffer circuitry receiving the first data from the data extraction circuit;
a multiplexer coupled to the buffer circuitry;
a processor circuit coupled to the data extraction circuit and the multiplexer, such that the processor generates justification event bits based on an amount of first data included in the input frame, the processor circuit also being configured to supply the justification event bits to the multiplexer; wherein the multiplexer is configured multiplex the first data with second data and supply an output frame that includes justification opportunity bytes, the first data, and the second data, the justification event bits indicating whether the justification opportunity bytes include a portion of the first data or null bits, such that a frequency associated with the first data is a predetermined frequency,
wherein the input frame is a first input frame, and the data extraction circuit is a first data extraction circuit, the apparatus further including:
a second data extraction circuit configured to receive a second input frame and extract the first input frame from the second input frame.

9. An apparatus in accordance with claim 8, wherein the first input frame includes justification control bytes, the data extraction circuit being configured to supply the justification control bytes to the processor circuit.

10. An apparatus in accordance with claim 8, wherein the output frame conforms to an ODU format.

11. An apparatus in accordance with claim 8, wherein the output frame conforms to a SONET format.

12. An apparatus in accordance with claim 8, wherein the second data extraction circuit includes a clock-and-data recovery circuit.

13. An apparatus in accordance with claim 8, further including a phase-lock-loop circuit coupled to the multiplexer, the phase-locked loop circuit supplying a clock signal to the multiplexer.

14. An apparatus, comprising:
an integrated circuit configured to receive an optical signal and convert the optical signal to an electrical signal carrying an input frame;
a data extraction circuit configured to receive the input frame and extract first data included in the input frame;
buffer circuitry which is coupled to the data extraction circuit, the buffer circuitry receiving the first data from the data extraction circuit;
a processor circuit coupled to the data extraction circuit and the buffer circuitry, such that the processor generates justification event bits based on an amount of first data included in the input frame, the processor circuit also being configured to insert justification opportunity bytes into the first data, the justification event bits indicating whether the justification opportunity bytes include a portion of the first data or null bits, such that a frequency associated with the first data is a predetermined frequency; and
a multiplexer coupled to the buffer circuitry, the multiplexer being configured to multiplex the first data with second data and supply an output frame including the first data, second data, and the justification opportunity bytes,
wherein the input frame is a first input frame, and the data extraction circuit is a first data extraction circuit, the apparatus further including:
a second data extraction circuit configured to receive a second input frame and extract the first input frame from the second input frame.

15. An apparatus in accordance with claim 14, wherein the optical signal is one of a plurality of optical signals, each of which having a corresponding one of a plurality of wavelengths, the integrated circuit receiving the plurality of optical signals.

16. An apparatus, comprising:
an integrated circuit configured to receive an optical signal and convert the optical signal to an electrical signal carrying an input frame;
a data extraction circuit configured to receive the input frame and extract data included in the input frame;
buffer circuitry which is coupled to the data extraction circuit, the buffer circuitry receiving the data from the data extraction circuit;
a multiplexer coupled to the buffer circuitry;
a processor circuit coupled to the data extraction circuit and the multiplexer, such that the processor generates justification event bits based on an amount of data included in the input frame, the processor circuit also being configured to supply the justification event bits to the multiplexer; wherein the multiplexer is configured to combine the first data with second data and supply an output frame that includes justification opportunity bytes, the first data, and the second data, the justification event bits indicating whether the justification opportunity bytes include a portion of the data or null bits, such that a frequency associated with the data is a predetermined frequency,
wherein the input frame is a first input frame, and the data extraction circuit is a first data extraction circuit, the apparatus further including:
a second data extraction circuit configured to receive a second input frame and extract the first input frame from the second input frame.

17. An apparatus in accordance with claim 16, wherein the optical signal is one of a plurality of optical signals, each of which having a corresponding one of a plurality of wavelengths, the integrated circuit receiving the plurality of optical signals.

18. A system, comprising:
an ingress node configured to receive a first frame including first data, the first data having an associated predetermined frequency; and
an egress node configured to receive a second frame including the first data, the egress node including:
a data extraction circuit configured to extract the first data included from the second frame;
buffer circuitry which is coupled to the data extraction circuit, the buffer circuitry receiving the first data from the data extraction circuit;
a processor circuit coupled to the data extraction circuit and the buffer circuitry, such that the processor circuit generates justification event bits based on an amount of first data included in the second frame, the processor circuit also being configured to add justification opportunity bytes to the first data, the justification event bits indicating whether the justification opportunity bytes include a portion of the first data or null bits; and
a multiplexer coupled to the buffer circuitry, the multiplexer being configured to multiplex the first data with second data and supply a third frame including the first data, second data, and the justification opportunity bytes, such that the first data included in the third frame has the associated predetermined frequency, wherein the input frame is a first input frame, and the data extraction circuit is a first data extraction circuit, the apparatus further including:

a second data extraction circuit configured to receive a second input frame and extract the first input frame from the second input frame.

19. A system, comprising:

an ingress node configured to receive a first frame including first data, the first data having an associated predetermined frequency; and an egress node configured to receive a second frame including the first data, the egress node including:

a data extraction circuit configured to receive the second frame and extract the first data from the second frame;

buffer circuitry which is coupled to the data extraction circuit, the buffer circuitry receiving the first data from the data extraction circuit;

a multiplexer coupled to the buffer circuitry;

a processor circuit coupled to the data extraction circuit and the multiplexer, such that the processor generates justification event bits based on an amount of first data included in the second frame, the processor circuit also being configured to supply the justification event bits to the multiplexer; wherein the multiplexer is configured multiplex the first data with second data and supply a third frame that includes justification opportunity bytes, the first data, and the second data, the justification event bits indicating whether the justification opportunity bytes include a portion of the first data or null bits, such that the first data included in the third frame has the associated predetermined frequency, wherein the input frame is a first input frame, and the data extraction circuit is a first data extraction circuit, the apparatus further including:

a second data extraction circuit configured to receive a second input frame and extract the first input frame from the second input frame.

20. An apparatus, comprising:

a data extraction circuit configured to receive a plurality of successive input frames and extract first data included in the plurality of successive input frames;

buffer circuitry which is coupled to the data extraction circuit, the buffer circuitry receiving the first data from the data extraction circuit;

a processor circuit coupled to the data extraction circuit and the buffer circuitry, such that the processor circuit generates justification event bits based on an average amount of the first data included in each of the plurality of successive input frames, the processor circuit also being configured to add justification opportunity bytes to the first data, the justification event bits indicating whether the justification opportunity bytes include a portion of the first data or null bits, such that a frequency associated with the first data is a predetermined frequency; and a multiplexer coupled to the buffer circuitry, the multiplexer being configured to multiplex the first data with second data and supply a plurality of successive output frames including the first data, second data, and the justification opportunity bytes, wherein the input frame is a first input frame, and the data extraction circuit is a first data extraction circuit, the apparatus further including:

a second data extraction circuit configured to receive a second input frame and extract the first input frame from the second input frame.

21. An apparatus, comprising:

a data extraction circuit configured to receive a plurality of successive input frames and extract first data included in the plurality of successive input frames;

buffer circuitry which is coupled to the data extraction circuit, the buffer circuitry receiving the first data from the plurality of successive input frames;

a multiplexer coupled to the buffer circuitry;

a processor circuit coupled to the data extraction circuit and the multiplexer, such that the processor generates justification event bits based on an average amount of the first data included in each of the plurality of successive input frames, the processor circuit also being configured to supply the justification event bits to the multiplexer, wherein the multiplexer is configured multiplex the first data with second data and supply a plurality of successive output frames that include justification opportunity bytes, the first data, and the second data, the justification event bits indicating whether the justification opportunity bytes include a portion of the first data or null bits, such that a frequency associated with the first data is a predetermined frequency, wherein the input frame is a first input frame, and the data extraction circuit is a first data extraction circuit, the apparatus further including:

a second data extraction circuit configured to receive a second input frame and extract the first input frame from the second input frame.

* * * * *